Jan. 7, 1969  A. GÖTZ  3,420,295
HEAT-EXCHANGER, ESPECIALLY FOR HEATING AND COOLING THE
LUBRICANT OF LIQUID-COOLED INTERNAL COMBUSTION ENGINE
Filed July 25, 1966

INVENTOR
ALFRED GÖTZ

BY *Dicke + Craig*
ATTORNEYS

INVENTOR
ALFRED GÖTZ

BY Dicke + Craig
ATTORNEYS

United States Patent Office 3,420,295
Patented Jan. 7, 1969

3,420,295
HEAT-EXCHANGER, ESPECIALLY FOR HEATING AND COOLING THE LUBRICANT OF LIQUID-COOLED INTERNAL COMBUSTION ENGINE
Alfred Götz, Stuttgart, Germany, assignor to Daimler-Benz Aktiengesellschaft, Stuttgart-Unterturkheim, Germany
Filed July 25, 1966, Ser. No. 567,421
Claims priority, application Germany, July 29, 1965, D 47,856
U.S. Cl. 165—51         26 Claims
Int. Cl. F28d 1/04

ABSTRACT OF THE DISCLOSURE

A heat exchanger, particularly for heating and cooling the lubricant of liquid-cooled internal combustion engines, including a series of finned tubes adapted for conveying the cooling fluid, surrounded by a housing, which housing is composed of a plurality of axially-aligned sections conforming to the circumference of the finned tubes and thereby providing a serpentine flow path for the lubricant over the exterior of the finned tubes. According to one embodiment of the invention, several rows of finned tubes are arranged within the housing and the lubricant entering the heat exchanger is divided into a plurality of substantially parallel streams.

---

The present invention relates to a heat-exchanger, especially for heating and cooling the lubricant of liquid-cooled internal combustion engines by means of the cooling liquid thereof, having heat exchange pipes traversed by the cooling liquid externally about which pipes flows the lubricant.

Heat-exchangers for the most varied applications are known in the prior art in numerous constructions thereof. A known construction of a heat exchanger for liquid-cooled internal combustion engines, for purposes of heating the lubricant with a still cold engine by the more rapidly heating cooling medium, and for purposes of cooling the lubricant with a hot engine by the cooling medium cooled off in the cooler or radiator, essentially consists, for example, of externally smooth heat exchange pipes conducting the cooling medium which are arranged in the heat exchanger housing and about the outer surface of which flows the lubricant in the longitudinal direction thereof. A direct constrained and forced flow of the lubricant along the surface of the heat exchange pipe does not exist in this prior art construction which adversely affects the heat exchange efficiency. The aim to improve the heat exchange efficiency leads to heat exchanges having a costly and complicated as well as in part spatially unfavorable construction.

Furthermore, pipes with ribs are generally in use with heat-exchangers for increasing the heat transmitting or heat absorbing surface, about which flows disadvantageously without guidance the medium participating in the heat exchange.

The present invention aims at creating with the use of ribbed pipes a heat exchanger of the aforementioned type, which, with a simple and spatially compact construction, simultaneously assures a high heat exchange efficiency.

The solution of the underlying problem is characterized according to the present invention by heat exchange pipes provided with ribs which are disposed parallel to one another, mutually contacting each other with the outer circumference of the ribs thereof, and between which the lubricant is positively or forcibly guided perpendicularly to the longitudinal axis of the heat exchange pipes, sequentially flowing about the same, and is further characterized by a guide housing for the lubricant form-lockingly surrounding the ribs of the heat exchange pipes laterally at the outer circumference thereof and having a lubricant inlet and a lubricant outlet as well as deflection chambers disposed therebetween which are disposed diametrically opposite each other in alternating sequence and are offset in the longitudinal direction in such a manner that the path of the lubricant extends in a serpentine-like or zig-zag like shape over the entire length of the heat exchange pipes.

In the actual construction according to the present invention, separating walls are provided at the guide housing for the lubricant which are disposed perpendicularly to the longitudinal axis of the heat exchange pipes and which extend in alternating sequence only up to the opposite deflection chamber whereby they leave free the interior space thereof.

For purposes of simplification from a manufacturing point of view, the guide housing for the lubricant may be composed according to the present invention in the manner of building blocks of several individual ring parts so that different lengths of the heat exchange pipes can be taken into account in a most simple manner.

In order to improve the heat exchange efficiency and to keep the length of the heat exchange pipes and the length of the flow path for the lubricant relatively short in order that the flow resistance remains within permissive and tolerable limits, it is additionally proposed, in accordance with the present invention, to assemble several rows of heat exchange pipes within one and the same guide housing for the lubricant which are loaded or acted upon by partial streams of the lubricant extending parallel to each other.

According to a further feature of the present invention, a cover (housing cover) is provided at one end face of the guide housing for the lubricant, within which are provided a lubricant inlet or supply channel terminating in the lubricant inlet of the guide housing as well as a cooling medium supply channel terminating in the heat exchange pipes and a cooling medium return channel receiving the cooling medium flowing out of the heat exchange pipes.

Within the scope of the present invention and in particular on the basis of the last-mentioned features, the housing cover of the heat exchanger serves simultaneously as upper closure cover for a pot accommodating the heat exchanger and a lubricant filter connected downstream with respect to the heat exchanger in the flow direction of the lubricant, whereby the lubricant discharged out of the heat exchanger flows into the interior space of the pot in order to pass thereupon through the filter for purposes of cleansing.

A maximum utilization of the entire length of the heat exchanger pipes for the heat exchange between the participating media together with a spatially compact type of structure as well as a simple construction of the heat exchanger is achieved by the present invention owing to the positive and forcible guidance of the medium (lubricant) also flowing about the ribs of the heat exchange pipes.

Accordingly, it is an object of the present invention to provide a heat exchanger, especially for the lubricant of liquid cooled internal combustion engines, which avoids, by extremely simple means, the aforementioned shortcomings and drawbacks encountered with the prior art construtcions.

It is another object of the present invention to provide a heat exchanger for heating and cooling the lubricant of liquid-cooled internal combustion engines which is characterized by a better heat exchange efficiency without involving expensive as well as complicated constructions that are at least partially unfavorable from a spatial point of view.

A further object of the present invention resides in a heat exchanger of the type described above in which the lubricant is subjected to a constrained flow to improve the heat exchange degree of the overall installation.

Still another object of the present invention resides in a heat exchange device for use in particular with the lubricant of internal combustion engines, in which a high heat exchange efficiency is assured with a simultaneous simple and spatially compact construction.

Still another object of the present invention resides in a heat exchanger of the type described above which can be constructed of different lengths by extremely simple means thereby being able to take into consideration different design considerations involved with the heat exchange pipes thereof.

These and further objects, features and advantages of the present invention will become more obvious from the following description when taken in connection with the accompanying drawing which shows, for purposes of illustration only, one embodiment in accordance with the present invention, and wherein.

Figure 1:
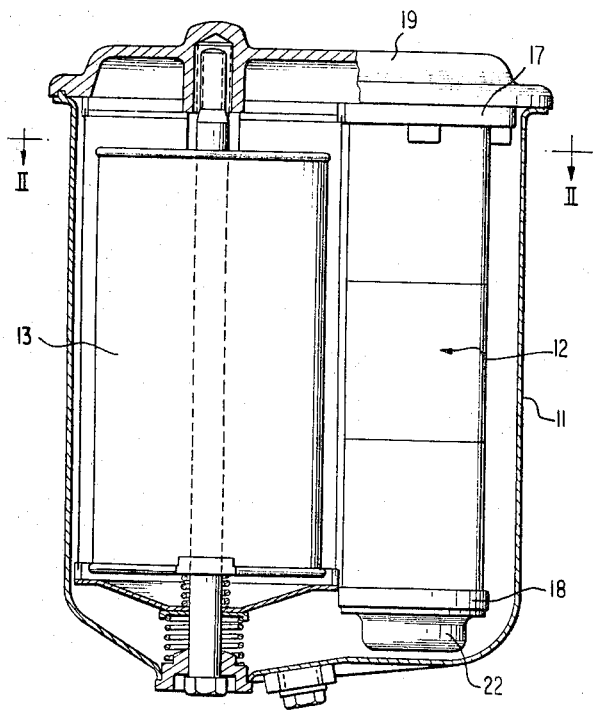
FIGURE 1 is an elevational view of a structural unit consisting of heat exchanger and lubricant filter in accordance with the present invention for an internal combustion engine, with parts thereof shown in cross section for the sake of clarity.
Figure 2:
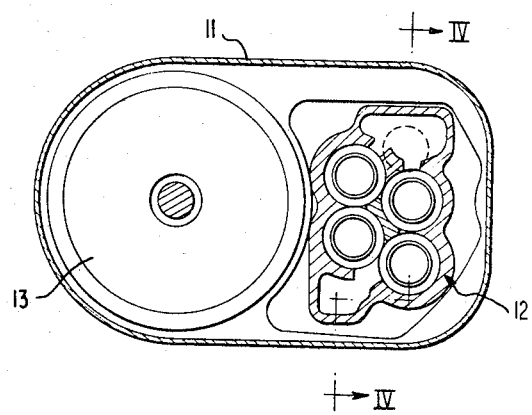
FIGURE 2 is a cross-sectional view taken along line II—II of FIGURE 1.
Figure 3:
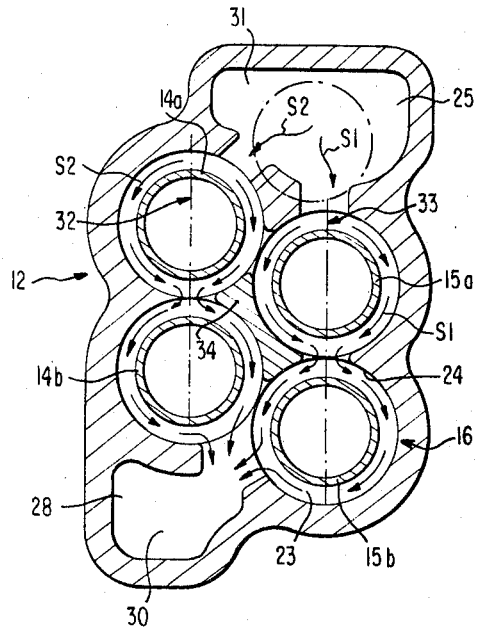
FIGURE 3 is a cross-sectional view, on an enlarged scale, illustrating the heat exchanger by itself according to the showing thereof in FIGURE 2.

Referring now to the drawing wherein like reference numerals are used throughout the various views to designate like parts, a heat exchanger generally designated by reference numeral 12 and a lubricant filter 13 are arranged within a common housing 11 to form a unitary structure. The heat exchanger 12 essentially consists of heat exchange pipes 14a, 14b, 15a and 15b (FIGURE 3) through which flows the cooling medium K of the internal combustion engine, of a guide housing generally designated by reference numeral 16 for the lubricant S, of a forward securing flange 17 and a rear securing flange 18, into which the heat exchange pipes 14a, 14b, 15a and 15b are inserted either rigidly or detachably, for example, by means of sealing rings, and of a housing cover 19 which simultaneously serves as upper-closure-cover for the housing 11.

Figure 4:
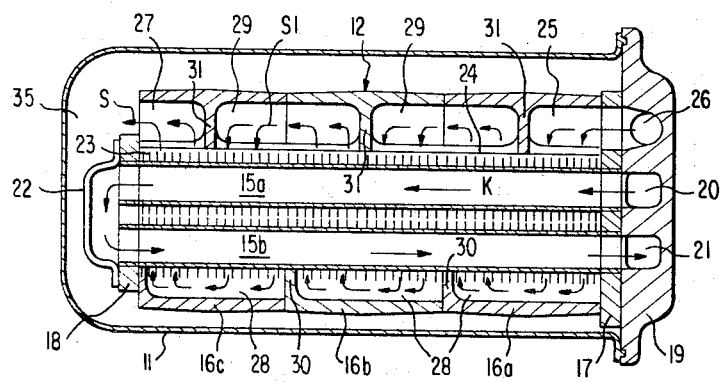
FIGURE 4 is a cross-sectional view taken along line IV—IV of FIGURE 2.

The cooling medium K enters the heat exchange pipes 14a and 15a by way of an inlet or supply channel 20 (FIGURE 4) arranged in the housing cover 19, flows through the pipes 14a and 15a over the entire length thereof, then transfers over into the heat exchange pipes 14b and 15b, respectively, also flowing through these pipes 14b and 15b over the length thereof and thereafter leaves the heat exchanger exclusively by way of a return channel 21 disposed within the housing cover 19. The deflection of the cooling medium K takes place by a cover 22 which bridges, respectively, two heat exchange pipes each, namely pipes 14a and 14b as well as pipes 15a and 15b. These heat exchange pipes 14a, 14b, 15a and 15b are provided with parallel ribs 23 whose outer circumference is tightly surrounded or enclosed by the inner circumference 24 of the guide housing 16. The guide housing 16 consists of three annular parts or sections 16a, 16b and 16c. A lubricating inlet 25 is provided at the outer end of the annular part 16a, into which terminates a lubricant supply or inlet channel 26 arranged within the housing cover 19. The lubricating discharge or outlet 27 is disposed at the outer end of the annular part 16c. Deflection chambers 28 and 29 are provided within the guide housing 16 which are disposed diametrically opposite one another and are mutually offset in the longitudinal direction in such a manner that the path of the lubricant S extends in a zig-zag like shape over the entire length of the heat exchange pipes 14a and 14b as well as 15a and 15b. The annular housing parts 16a, 16b and 16c are provided with separating walls 30 and 31 directed perpendicularly to the heat exchange pipes 14a, 14b, 15a and 15b; the separating walls 30 and 31 extending alternately and sequentially only up to the respective oppositely disposed deflection chamber 28 and 29 whereby they leave-free the inner space thereof in order to keep open a flow path for the lubricant S.

Two rows of heat exchange pipes are arranged within the guide housing 16, and more particularly one row 32 with the heat exchange pipes 14a and 14b, about which flows a lubricant partial stream $S_1$, and another row 33 with the heat exchange pipes 15a and 15b, about which flows a second lubricant partial stream $S_2$. A correspondingly shaped filler piece 34 (FIGURE 3) is disposed between the two rows 32 and 33. The two parallel partial lubricant streams $S_1$ and $S_2$ are supplied by way of the common lubricant inlet 25 and terminate in the common lubricant outlet 27. The lubrican S flows through between the individual ribs 23 of the heat exchange pipes 14a and 14b or 15a and 15b respectively, whereby the ribs 23 thereof mutually contact each other along the outer circumference thereof, and in this way gives off heat to the ribs 23 of the heat exchange pipes with a hot internal combustion engine or absorbs heat with a cold engine which is transmitted from the cooling medium K to the heat exchange pipes and ribs 23 thereof. The lubricant S flows out of the heat exchanger 12 into the interior space 35 of the housing 11 where is also arranged the filter 13, and then flows through the filter 13 whereby it is filtered and cleaned.

Known bi-metallic rib pipes may be used as heat exchange pipes 14a, 14b, 15a and 15b which consist of an inner core-pipe made of a conventional copper-nickel alloy and of a ribbed aluminum pipe rolled thereon.

While I have shown and described one embodiment in accordance with the present invention, it is understood that the same is not limited thereto but is susceptible of numerous changes and modifications as known to a person skilled in he art. Thus, within the scope of the present invention and while maintaining the basic advantages thereof, a number of changes are possible as regards the mutual position of the heat exchange pipes. For example, the heat exchange pipes may be arranged along a circle as viewed in cross section through the heat exchanger whereby the lubricant is supplied and discharged centrally in the axial direction and could be alternately deflected radially inwardly and outwardly within the housing by partition walls so that also in this case the rib pipes guiding the cooling medium are surrounded over the entire length thereof by zig-zag-shaped flow surfaces.

Thus, it is obvious that the present invention is susceptible of numerous changes and modifications as known to a person skilled in the art and I therefore do not wish to be limited to the details shown and described herein but intend to cover all such changes and modifications as are encompassed by the scope of the appended claims.

I claim:
1. A heat exchanger, comprising heat exchange pipe means through which flows a cooling medium and about which flows the liquid to be controlled in its temperature, said heat exchange pipe means being provided with rib means and being disposed substantially parallel to one another, and guide housing means form-lockingly surrounding the rib means of the heat exchange pipe means and provided with inlet and outlet means for said liquid as well as with deflecting means to provide a flow path for said liquid which extends over the entire length of the heat exchange pipe means essentially in a serpentine-like manner, said deflecting means including diametrically opposite deflection chambers disposed between said inlet and outlet means which are offset to each other in the longitudinal direction in such a manner as to produce a flow of the liquid in a serpentine-like shape along the entire length of the pipe means, said pipe means being traversed by the cooling liquid of an internal combustion engine and the liquid flowing about the pipe means being the engine lubricant, the outer circumference of said rib means mutually contacting each other, said guide housing means being provided with separating wall means directed substantially transversely to the longitudinal axis of the pipe means, said separating wall means extending in alternating sequence only up to the oppositely disposed deflection chamber while leaving free in the space thereof, said guide housing means being composed of individual annular sections.

2. A heat exchanger according to claim 1, wherein each annular section is provided with two separating walls.

3. A heat exchanger according to claim 2, wherein several rows of heat exchange pipe means are arranged within a guide housing means and are acted upon by mutually substantially parallel partial lubricant streams.

4. A heat exchanger according to claim 3, wherein a common inlet means and a common outlet means for the liquid is provided within the guide housing means for the individual rows of the heat exchange pipe means.

5. A heat exchanger according to claim 4, further comprising a correspondingly shaped filler piece arranged between each two rows of heat exchange pipe means.

6. A heat exchanger according to claim 4, wherein one securing flange is provided at each of the forward annular housing section and at the rearward annular housing section, the ends of the heat exchange pipe means being inserted into said securing flanges.

7. A heat exchanger according to claim 6, wherein said heat exchange pipe means are securely inserted into the flanges.

8. A heat exchanger according to claim 6, wherein said heat exchange pipe means are detachably inserted into said pipe means.

9. A heat exchanger according to claim 8, further comprising annular seal means detachably inserting said heat exchange pipe means into said flange means.

10. A heat exchanger according to claim 6, further comprising housing cover means detachably connected with the forward securing flange, said housing cover means being provided with a liquid supply channel terminating in said liquid inlet means.

11. A heat exchanger according to claim 10, wherein a supply channel and a discharge channel for the cooling medium are provided in said housing cover means.

12. A heat exchanger according to claim 11, further comprising lubricant filter means, said heat exchanger and said lubricant filter which is connected downstream of said heat exchanger forming a structural unit, said housing cover means serving simultaneously as upper closure cover of an external housing within which are installed the heat exchanger and the filter means.

13. A heat exchanger according to claim 12, further comprising deflecting cover means for the cooling of medium arranged at the rear securing flange for bridging the ends of two respective heat exchange pipe means.

14. A heat exchanger, comprising heat exchange pipe means through which flows a cooling medium and about which flows the liquid to be controlled in its temperature, said heat exchange pipe means being provided with rib means and being disposed substantially parallel to one another, and guide housing means form-lockingly surrounding the rib means of the heat exchange pipe means and provided with inlet and outlet means for said liquid as well as with deflecting means to provide a flow path for said liquid which extends over the entire length of the heat exchange pipe means essentially in a serpentine-like manner, wherein said guide housing means is composed of individual annular sections.

15. A heat exchanger according to claim 14, wherein each annular section is provided with two separating walls.

16. A heat exchanger, comprising heat exchange pipe means through which flows a cooling medium and about which flows the liquid to be controlled in its temperature, said heat exchange pipe means being provided with rib means and being disposed substantially parallel to one another, and guide housing means form-lockingly surrounding the rib means of the heat exchange pipe means and provided with inlet and outlet means for said liquid as well as with deflecting means to provide a flow path for said liquid which extends over the entire length of the heat exchange pipe means essentially in a serpentine-like manner, wherein several rows of heat exchange pipe means are arranged within said guide housing means providing at least two substantially parallel flow paths for partial streams of the lubricant entering said heat exchanger.

17. A heat exchanger according to claim 16, wherein a common inlet means and a common outlet means for the liquid is provided within the guide housing means for the individual rows of the heat exchange pipe means.

18. A heat exchanger according to claim 16, further comprising a correspondingly shaped filler piece arranged between each two rows of heat exchange pipe means.

19. A heat exchanger according to claim 16, wherein said guide housing means includes two or more individual annular sections and one securing flange is provided at each end of said guide housing means, the ends of the heat exchange pipe means being inserted into said securing flanges.

20. A heat exchanger according to claim 19, wherein said heat exchange pipe means are securely inserted into the flanges.

21. A heat exchanger according to claim 19, wherein said heat exchange pipe means are detachably inserted into said pipe means.

22. A heat exchanger according to claim 21, further comprising annular seal means detachably inserting said heat exchange pipe means into said flange means.

23. A heat exchanger according to claim 19, further comprising housing cover means detachably connected with one securing flange, said housing cover means being provided with a liquid supply channel terminating in said liquid inlet means.

24. A heat exchanger according to claim 23, wherein a supply channel and a discharge channel for the cooling medium are provided in said housing cover means.

25. A heat exchanger according to claim 23, further comprising lubricant filter means, said heat exchanger and said lubricant filter, which is connected downstream of said heat exchanger, forming a structural unit, said housing cover means serving simultaneously as upper closure cover of an external housing within which are installed the heat exchanger and the filter means.

26. A heat exchanger according to claim 19, further comprising deflecting cover means for the cooling of medium arranged at one securing flange for bridging the ends of two respective heat exchange pipe means.

References Cited

UNITED STATES PATENTS

| | | | |
|---|---|---|---|
| 3,042,379 | 7/1962 | Hinde | 165—162 |
| 1,101,969 | 6/1914 | Still | 165—161 |
| 2,517,169 | 8/1950 | Bennett | 165—161 |
| 2,978,226 | 4/1961 | White | 165—176 |
| 3,205,940 | 9/1965 | Carns | 165—176 |
| 3,315,737 | 4/1967 | Welch | 165—119 |

ROBERT A. O'LEARY, *Primary Examiner.*

CHARLES SUKALO, *Assistant Examiner.*

U.S. Cl. X.R.

165—119, 176, 181